United States Patent
Ahn et al.

(10) Patent No.: US 9,159,969 B2
(45) Date of Patent: Oct. 13, 2015

(54) LAMINATE STRENGTHENED BATTERY PACK AND METHOD OF MANUFACTURING THE SAME

(75) Inventors: Changbum Ahn, Yongin-si (KR); Jangho Yoon, Yongin-si (KR); Chanhee Lee, Yongin-si (KR); Hadong Kim, Yongin-si (KR); Yunkyung Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 729 days.

(21) Appl. No.: 12/698,346

(22) Filed: Feb. 2, 2010

(65) Prior Publication Data
US 2010/0196745 A1 Aug. 5, 2010

(30) Foreign Application Priority Data
Feb. 5, 2009 (KR) .................. 10-2009-0009451

(51) Int. Cl.
*H01M 2/02* (2006.01)
*H01M 2/10* (2006.01)
*H01M 10/04* (2006.01)

(52) U.S. Cl.
CPC .......... *H01M 2/1061* (2013.01); *H01M 2/0207* (2013.01); *H01M 2/0275* (2013.01); *H01M 2/1022* (2013.01); *H01M 10/0431* (2013.01); *H01M 2200/00* (2013.01); *Y10T 29/4911* (2015.01); *Y10T 29/49108* (2015.01)

(58) Field of Classification Search
None
See application file for complete search history.

(56) References Cited

U.S. PATENT DOCUMENTS

| 6,083,640 | A | 7/2000 | Lee et al. |
| 6,139,986 | A * | 10/2000 | Kurokawa et al. ............ 429/61 |
| 6,743,546 | B1 | 6/2004 | Kaneda et al. |
| 2001/0038938 | A1 * | 11/2001 | Takahashi et al. ............ 429/53 |
| 2002/0150813 | A1 * | 10/2002 | Park et al. ..................... 429/56 |
| 2003/0180609 | A1 * | 9/2003 | Yamashita et al. ........... 429/185 |
| 2005/0118501 | A1 | 6/2005 | Hashimoto et al. |
| 2006/0210870 | A1 * | 9/2006 | Moon et al. .................. 429/175 |
| 2006/0216591 | A1 | 9/2006 | Lee |

(Continued)

FOREIGN PATENT DOCUMENTS

| CN | 1841835 A | 10/2006 |
| CN | 1992381 A | 7/2007 |

(Continued)

OTHER PUBLICATIONS

Machine translation of JP 08-329972, Fujiwara et al., Dec. 13, 1996.*

(Continued)

*Primary Examiner* — Patrick Ryan
*Assistant Examiner* — Wyatt McConnell
(74) *Attorney, Agent, or Firm* — Christie, Parker & Hale, LLP

(57) ABSTRACT

A battery pack and a method of manufacturing the same. The battery pack includes: a package member formed of a laminate strengthened sheet; and a support plate coupled to at least a portion of the package member to form a case having a space for receiving an electrode assembly. The manufacturing method of the battery pack includes: forming an electrode assembly; forming a case for receiving the electrode assembly by coupling a solid support plate to at least a portion of a package member formed of a laminate strengthened sheet; inserting the electrode assembly into the case; and electrically connecting the electrode assembly to a terminal assembly.

15 Claims, 7 Drawing Sheets

(56) References Cited

U.S. PATENT DOCUMENTS

| | | |
|---|---|---|
| 2006/0246349 A1 | 11/2006 | Uh |
| 2007/0128513 A1 | 6/2007 | Hatta et al. |
| 2007/0152631 A1 | 7/2007 | Seo |
| 2007/0154794 A1 | 7/2007 | Kim et al. |
| 2007/0207377 A1* | 9/2007 | Han et al. ..................... 429/162 |
| 2007/0224499 A1* | 9/2007 | Kodama et al. ............... 429/163 |
| 2007/0224501 A1* | 9/2007 | Yoon ............................ 429/176 |
| 2007/0287063 A1 | 12/2007 | Hiratsuka et al. |
| 2008/0299451 A1 | 12/2008 | Funahashi et al. |
| 2009/0098416 A1* | 4/2009 | Hatta et al. ........................ 429/7 |
| 2010/0196745 A1 | 8/2010 | Ahn et al. |
| 2011/0111265 A1 | 5/2011 | Jang |

FOREIGN PATENT DOCUMENTS

| | | |
|---|---|---|
| CN | 101267032 A | 9/2008 |
| EP | 1 708 295 A2 | 10/2006 |
| EP | 1 970 722 A2 | 9/2008 |
| EP | 2 063 474 A1 | 5/2009 |
| JP | 8-329972 | 12/1996 |
| JP | 10-112296 | 4/1998 |
| JP | 11-016546 | 1/1999 |
| JP | 2003-303580 | 10/2003 |
| JP | 2003-331799 | 11/2003 |
| JP | 2004-022208 | 1/2004 |
| JP | 2006-278331 | 10/2006 |
| JP | 2006-310268 | 11/2006 |
| JP | 2008-159559 | 7/2008 |
| JP | 2008-300144 | 12/2008 |
| KR | 10-2004-0005022 | 1/2004 |
| KR | 10-2007-0038113 | 4/2007 |
| KR | 10-2007-0058351 | 6/2007 |
| WO | WO 00/59063 A1 | 10/2000 |
| WO | WO 2008/078948 A1 | 7/2008 |

OTHER PUBLICATIONS

English machine translation of Japanese publication No. JP-8-329972 dated Dec. 13, 1996 in the name of Fujiwara et al.
English machine translation of Japanese publication No. JP 10-112296 dated Apr. 28, 1998 in the name of Yukita et al.
English machine translation of Japanese publication No. JP 11-016546 dated Jan. 22, 1999 in the name of Yishihisha.
KIPO Office action dated Aug. 18, 2010 issued in priority Korean application No. 10-2009-0009451.
SIPO Office action dated Jul. 8, 2013, with English translation, for Chinese Patent application 201010549636.3, (13 pages).
U.S. Office action dated Apr. 15, 2014, for cross reference U.S. Appl. No. 12/901,310, (15 pages).
U.S. Notice of Allowance dated Jul. 23, 2014, for cross reference U.S. Appl. No. 12/901,310, (8 pages).
English machine translation of Japanese Publication 2003/303580 listed above, (11 pages), Nov. 2003.
Patent Abstracts of Japan, and English machine translation of Japanese Publication 2004/022208 listed above, (20 pages), Jan. 2004.
European Search Report dated Mar. 2, 2011, for European Patent application 10191329.1, (6 pages).
KIPO Office action dated Jul. 28, 2011, for Korean Patent application 10-2009-0110520, (8 pages).
JPO Office action dated Sep. 18, 2012 for Japanese Patent application 2010-144715, (5 pages).
JPO Office action dated Jan. 15, 2013, for Japanese Patent application 2010-144715, (2 pages).
SIPO Office action dated Feb. 5, 2013, for Chinese Patent application 201010549636.3, with English translation, (12 pages).
U.S. Office action dated Nov. 7, 2012, for cross reference U.S. Appl. No. 12/901,310, (15 pages).
U.S. Office action dated Feb. 27, 2013, for cross reference U.S. Appl. No. 12/901,310, (12 pages).

* cited by examiner

LAMINATE STRENGTHENED BATTERY PACK AND METHOD OF MANUFACTURING THE SAME

CROSS-REFERENCE TO RELATED PATENT APPLICATION

This application claims priority to and the benefit of Korean Patent Application No. 10-2009-0009451, filed on Feb. 5, 2009, in the Korean Intellectual Property Office, the entire content of which is incorporated herein by reference.

BACKGROUND OF THE INVENTION

1. Field of the Invention

The present invention relates to a battery pack and a method of manufacturing the same, and more particularly, to a battery pack including a battery case configured to realize an increased battery capacity and an improved strength against external impact, and a method of manufacturing the same.

2. Description of the Related Art

There is a need for a portable electronic apparatus that is capable of performing various functions and be used for a long time. As such, due to their higher battery capacities, lithium secondary batteries have now been utilized as power sources for portable electronic apparatuses.

In secondary batteries, a battery case can be in the form of a metal can. Alternatively, in lithium polymer secondary batteries, a multi-layered pouch-shaped structure composed of an aluminum (Al) foil and a polymer film can be utilized as a battery case.

In order to increase the battery capacities of lithium secondary batteries, high capacity negative and/or positive electrode materials and/or thinner battery cases have been utilized. For example, when using a metal can as a battery case, the use of a thinner metal enables an increased amount of an electrode active material, thereby achieving higher capacity and higher charge/discharge efficiency of batteries. However, there is a limit in how much the thickness of the metal can be reduced. On the other hand, when using a multi-layered pouch-shaped structure as a battery case, it is possible to reduce the thickness of the battery case to a desired level and to achieve a significantly reduced battery weight as compared with the use of a metal can, but there arises a problem of insufficient strength against external impact.

Also, in the fabrication of a typical secondary battery, there is a need to separately perform a process of manufacturing a battery cell and a process of assembling the battery cell and a protection circuit into a pack, which makes the entire battery fabrication process complicated and time consuming.

SUMMARY OF THE INVENTION

An aspect of an embodiment of the present invention is directed toward a battery pack capable of increasing battery capacity and improving strength against external impact.

An aspect of an embodiment of the present invention is directed toward a method of manufacturing a battery pack, in which a battery cell fabrication process and a battery pack fabrication process are integrated (unified) and simplified, thereby resulting in improved battery productivity.

According to an embodiment of the present invention, a battery pack is provided to include: an electrode assembly; a terminal assembly electrically connected to the electrode assembly and for supplying current to an external circuit; a package member formed of a laminate strengthened sheet; and a support plate coupled to at least a portion of the package member to form a case having a space for receiving the electrode assembly.

The laminate strengthened sheet may have a folded rectangular (or square) shape.

Two opposite ends of the laminate strengthened sheet may be attached to each other.

The support plate may form a bottom surface or two opposite sides of the case. Alternatively, the support plate may form a bottom surface and two opposite sides of the case.

The support plate may be made of polypropylene (PP).

The laminate strengthened sheet of the package member may include: a blocking layer; an outer layer on a first surface of the blocking layer; and an inner layer on a second surface of the blocking layer opposite to the first surface of the blocking layer.

The package member may have a thickness between about 170 and about 300 μm.

The blocking layer may have a thickness between about 20 to about 150 μm, the outer layer may have a thickness between about 5 and about 30 μm, and the inner layer may have a thickness between about 30 and about 150 μm.

The blocking layer may be made of a metal selected from the group consisting of iron (Fe), nickel (Ni), aluminum (Al), and combinations thereof.

The outer layer may be made of a material selected from the group consisting of nylon, polyethyleneterephthalate (PET), and combinations thereof.

The inner layer may be made of cast polypropylene (CPP).

The terminal assembly may include: a cap plate having a first terminal through-hole for receiving an electrode terminal; a top case coupled to the cap plate and having a second terminal through-hole for receiving an external terminal for supplying current from the electrode terminal to an external circuit; and a protection circuit board in the top case and including the external terminal electrically connected to the electrode terminal passing through the cap plate via the first terminal through-hole and for controlling charge-discharge cycling of the battery pack.

The terminal assembly may further include a secondary protection device between the cap plate and the protection circuit board.

According to another embodiment of the present invention, there is provided a method of manufacturing a battery pack, the method including: forming an electrode assembly; forming a case for receiving the electrode assembly by coupling a solid support plate to at least a portion of a package member formed of a laminate strengthened sheet; inserting the electrode assembly into the case; and electrically connecting the electrode assembly to a terminal assembly.

The method may further include injecting an electrolyte solution into the case via an electrolyte solution injection hole formed in the case, after the electrically connecting of the electrode assembly to the terminal assembly. The method may further include sealing the electrolyte solution injection hole, after the injecting of the electrolyte solution into the case.

The method may further include injecting an electrolyte solution into the case, before the electrically connecting of the electrode assembly to the terminal assembly.

In one embodiment, during the electrically connecting of the electrode assembly to the terminal assembly, the terminal assembly may be coupled to a portion of the package member by thermal fusion or high frequency heating.

BRIEF DESCRIPTION OF THE DRAWINGS

The accompanying drawings, together with the specification, illustrate exemplary embodiments of the present inven

DETAILED DESCRIPTION

Figure 1:
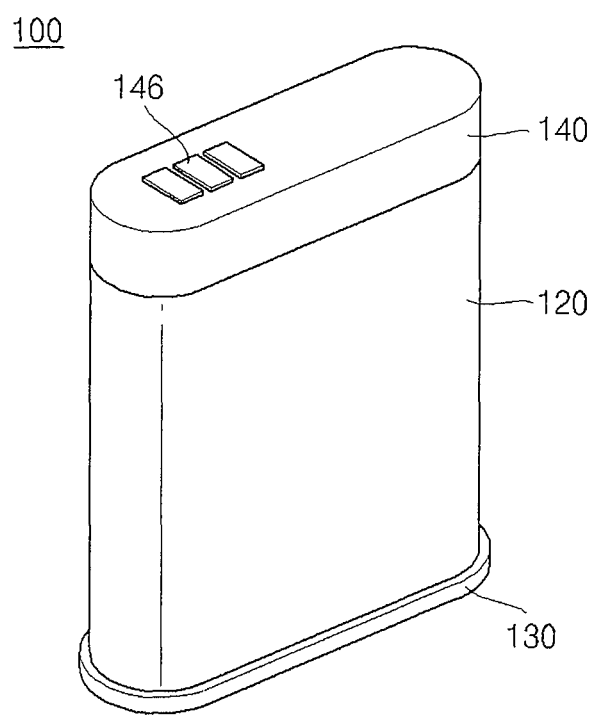
- FIG. 1 is a perspective schematic view of a battery pack according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Figure 2:
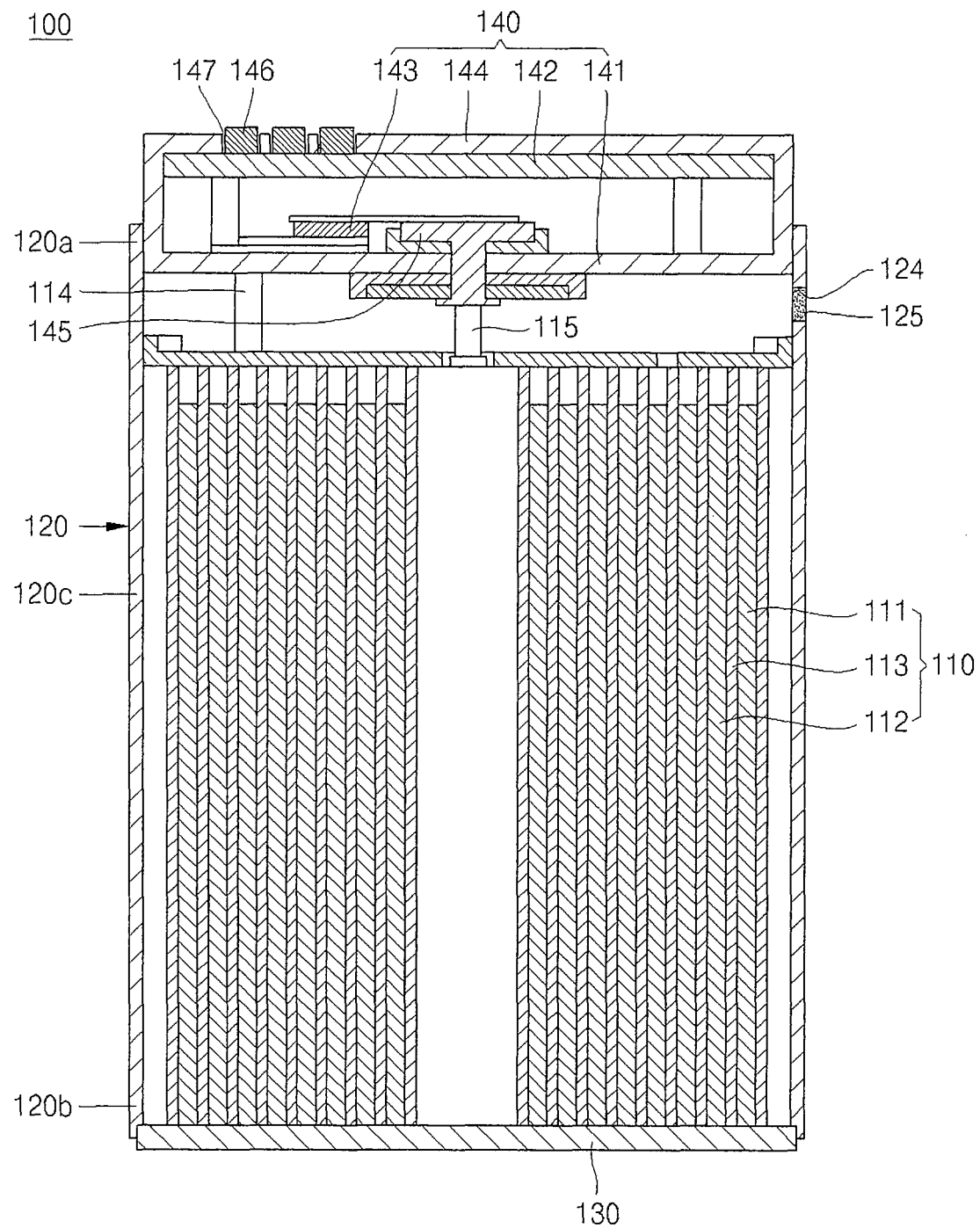
FIG. 2 is a vertical sectional schematic view of the battery pack of FIG. 1.
Figure 3:
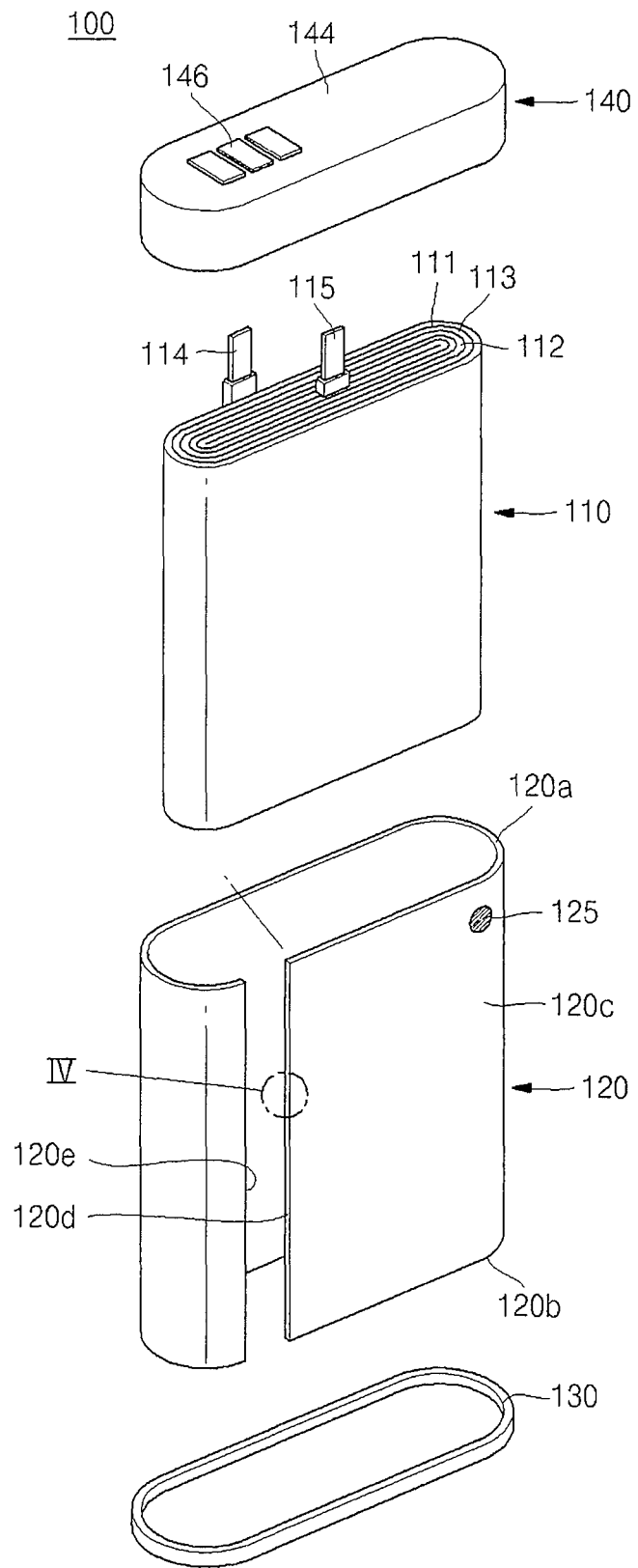
FIG. 3 is an exploded perspective schematic view of the battery pack of FIG. 1.
Figure 4:
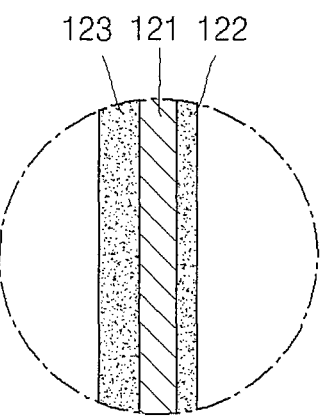
FIG. 4 is an enlarged schematic view of a portion IV of FIG. 3.

FIG. 1 is a perspective schematic view of a battery pack according to an embodiment of the present invention, FIG. 2 is a vertical sectional schematic view of the battery pack of FIG. 1, FIG. 3 is an exploded perspective schematic view of the battery pack of FIG. 1, and FIG. 4 is an enlarged schematic view of a portion IV of FIG. 3.

Referring to FIGS. 1 through 4, a battery pack 100 according to an embodiment of the present invention includes an electrode assembly 110; a package member 120; a support plate 130 coupled to at least a portion (e.g., a bottom portion in FIG. 1) of the package member 120 to form a case for receiving the electrode assembly 110; and a terminal assembly 140 coupled to a portion (e.g., a top portion in FIG. 1) of the package member 120.

The electrode assembly 110 may be formed by winding a positive electrode plate 111, a negative electrode plate 112, and a separator 113 interposed therebetween into a jelly roll-type structure (or substantially into a jelly roll-type structure). A positive electrode tab 114 is coupled to the positive electrode plate 111, and a negative electrode tab 115 is coupled to the negative electrode plate 112.

The package member 120 may be formed of a rectangular sheet 120c with an upper end 120a, a lower end 120b, and two opposite sides 120d and 120e. When the two opposite sides 120d and 120e of the sheet are attached, the sheet is formed into a tube (e.g., an elliptical tube) with open upper and lower ends.

The package member 120 may have a thickness between about 170 and about 300 µm. In one embodiment, if the thickness of the package member 120 is less than 170 µm, it may not have sufficient strength against external impact. In another embodiment, if the thickness of the package member 120 is greater than 300 µM, it may not improve battery capacity as compared with a metal can-type package member.

The package member 120 is composed of a laminate strengthened sheet (high strength laminate sheet) that includes (or is composed of) a blocking layer 121; an outer layer 122 disposed on a first surface of the blocking layer 121; and an inner layer 123 disposed on a second surface of the blocking layer 121 opposite to the first surface of the blocking layer 121.

In one embodiment, the blocking layer 121 is formed of a metal material. In one embodiment, the metal material includes a metal selected from the group consisting of iron (Fe), nickel (Ni), aluminum (Al), and combinations thereof. Such a metal material has a strong mechanical strength and a good corrosion resistance, thereby leading to improved mechanical strength of the package member 120 and good corrosion resistance against an electrolyte solution. The use of such a metal material also reduces or prevents moisture penetration into the electrode assembly 110 of the battery pack 100. The metal material may have a percent elongation (percent elongation at fracture) of between about 20 and 60%. The thickness of the blocking layer 121 may be between 20 and 150 µm.

The outer layer 122 constitutes an outer surface of the package member 120. In this regard, the outer layer 122 may be made of a material having good tensile strength, impact strength, and durability, e.g. nylon and/or polyethyleneterephthalate (PET). The outer layer 122 may be laminated on the outer surface of the blocking layer 121 by heat treatment at high temperature. The thickness of the outer layer 122 may be between about 5 and 30 µm.

PET may be used in the form of an alloy film. PET may not contain an adhesive. In this case, a PET film is attached to a surface of the blocking layer 121 by utilizing an adhesive between the PET film and the blocking layer 121 (e.g., an adhesive applied to the surface of the blocking layer 121).

The inner layer 123 may be made of cast polypropylene (CPP). CPP may be coated to a thickness between about 30 and 150 µm on the inner surface of the blocking layer 121.

The support plate 130 may be an elliptical or rectangular plate. The support plate 130 may be made of polypropylene (PP).

The support plate 130 may be coupled to the bottom end 120b of the package member 120. When the support plate 130 is the elliptical or rectangular plate, the package member 120 may be formed to have a parallelepiped shape (e.g., a rectangular parallelepiped shape) due to coupling between it and the support plate 130.

The terminal assembly 140 includes a cap plate 141; a protection circuit board 142; a secondary protection device 143 disposed between the cap plate 141 and the protection circuit board 142; and a top case 144 receiving the cap plate 141, the protection circuit board 142, and the secondary protection device 143.

The cap plate 141 may be coupled to the top end 120a of the package member 120. A negative terminal 145 electrically connected to the negative electrode tab 115 of the electrode assembly 110 is disposed to pass through a center portion of the cap plate 141. The cap plate 141 may be made of an aluminum material and is electrically connected to the positive electrode tab 114 of the electrode assembly 110.

The protection circuit board 142 includes an external terminal 146 that is electrically connected to the negative terminal 145 and supplies current to an external circuit; and an electrical circuit device controlling the charge/discharge cycling of the battery pack 100. The protection circuit board 142 is fixedly installed between the cap plate 141 and the top case 144.

The top case 144 may be coupled to a top portion of the cap plate 141. A terminal through-hole 147 through which the external terminal 146 of the protection circuit board 142 is exposed is formed in the top case 144.

A procedure of assembling the above-described constitutional elements into the battery pack 100 will now be described.

First, the bottom end 120b of the package member 120 is coupled to a top end of the support plate 130. Here, the bottom end 120b of the package member 120 may be thermally fused to the top end of the support plate 130. The support plate 130 may be made of polypropylene, and the inner layer 123 of the package member 120 may be made of polypropylene or cast polypropylene (CPP), leading to good adhesion between the package member 120 and the support plate 130.

As such, when the bottom end 120b of the package member 120 is thermally fused to the top end of the support plate 130, a bottom of a case formed by thermal fusion between the package member 120 and the support plate 130 is sealed with the support plate 130, and a top thereof is open. Here, when the support plate 130 is an elliptical or rectangular plate the package member 120 can maintain a parallelepiped or rectangular parallelepiped shape due to the coupling between it and the support plate 130.

Next, the electrode assembly 110 is inserted into the case formed by the package member 120 and the support plate 130 via the top end 120a. In this state, the terminal assembly 140 is coupled to the package member 120. In more detail, the top end 120a of the package member 120 may be thermally fused to the terminal assembly 140. That is, the top end 120a of the package member 120 may be thermally fused to a side portion of the cap plate 141 of the terminal assembly 140. The top end 120a of the package member 120 may also be coupled to the cap plate 141 of the terminal assembly 140 by high frequency heating.

After coupling the package member 120 to the terminal assembly 140, an electrolyte solution is injected. That is, an electrolyte solution is injected into an electrolyte solution injection hole 124 formed in an upper side of the package member 120. Then, the electrolyte solution injection hole 124 is sealed with a sealing member 125. This completes the battery pack 100.

Hereinafter, battery packs according to other embodiments of the present invention will be described.

Battery packs as will be described hereinafter are substantially the same as the battery pack 100 according to the above-described embodiment of the present invention except for a coupling structure between a package member and a support plate, and thus, a detailed description about elements other than a package member and a support plate will not be provided again.

Figure 5:
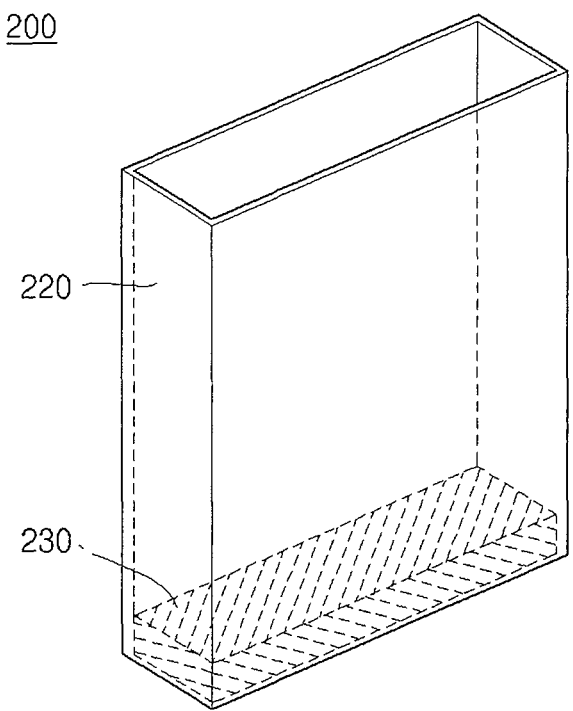
FIG. 5 is a perspective schematic view illustrating a coupling structure between a package member and a support plate in a battery pack according to another embodiment of the present invention.

FIG. 5 illustrates a battery pack 200 according to another embodiment of the present invention, the battery pack 200 is substantially the same as the battery pack 100 of the previous embodiment in that a support plate 230 is disposed below a package member 220, but the package member 220 is coupled to the support plate 230 to wholly surround side surface(s) (e.g., four side surfaces) of the support plate 230.

That is, in the battery pack 100 of the previous embodiment, the package member 120 is coupled to a portion (e.g., the top end 120a in FIG. 1) of the support plate 130 so that the side surface(s) of the support plate 130 is exposed to the outside. By contrast, according to the current embodiment of the present invention, the package member 220 is coupled to the support plate 230 to wholly surround the side surface(s) of the support plate 230 so that the support plate 230 is not exposed to the outside. As such, since the package member 220 wholly surrounds the side surface(s) of the support plate 230, an adhesion area between the package member 220 and the support plate 230 is increased, thereby leading to improved adhesion strength.

As described above, according to the battery pack 200 of the current embodiment of the present invention, the package member 220 is coupled to the support plate 230 to form a case, and the bottom of the case is sealed with the support plate 230. When the support plate 230 has substantially a rectangular plate shape as shown in FIG. 5 the package member 220 can stably maintain substantially a rectangular parallelepiped shape due to the coupling between it and the support plate 230.

Figure 6:
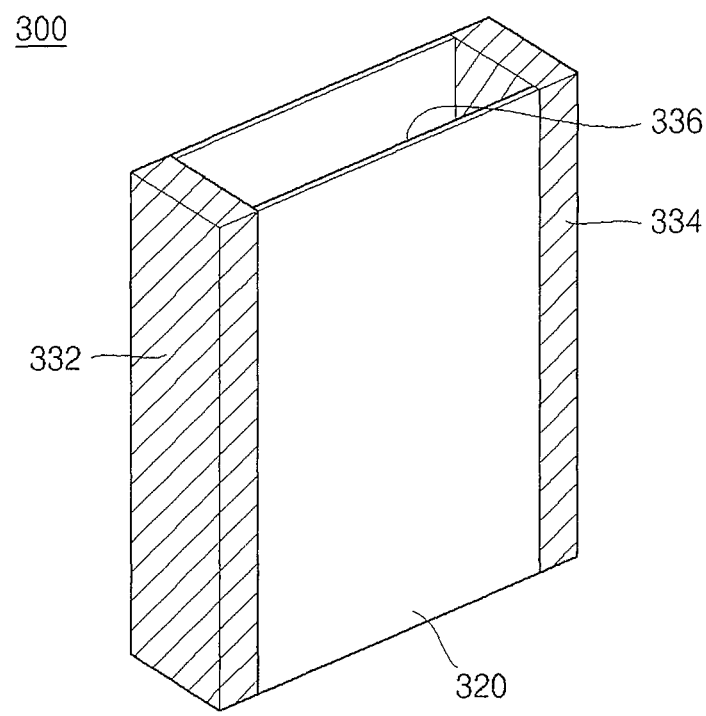
FIG. 6 is a perspective schematic view illustrating a coupling structure between a package member and a support plate in a battery pack according to another embodiment of the present invention.

FIG. 6 illustrates a battery pack 300 according to another embodiment of the present invention.

Referring to FIG. 6, the battery pack 300 is structured such that a package member 320 is coupled to support plates 332 and 334 to form a case, and the support plates 332 and 334 form two opposite sides of the case.

Under such a structure, a top of the case has an opening 336. An electrode assembly (e.g., the electrode assembly 110 of FIG. 2) is inserted into the case via the opening 336.

In this state, a terminal assembly (e.g., the terminal assembly 140 of FIG. 2) is inserted into the opening 336 and is electrically connected to the electrode assembly.

As described above, according to the battery pack 300 of the current embodiment of the present invention, the package member 320 is coupled to the support plates 332 and 334 to form the case for receiving the electrode assembly 110, and the support plates 332 and 334 form two opposite sides of the case. When the support plates 332 and 334 have a rectangular plate shape as shown in FIG. 6 after coupling the terminal assembly (e.g., the terminal assembly 140) to the package member 320, the package member 320 can stably maintain a rectangular parallelepiped shape due to the coupling between it and the support plates 332 and 334.

Figure 7:
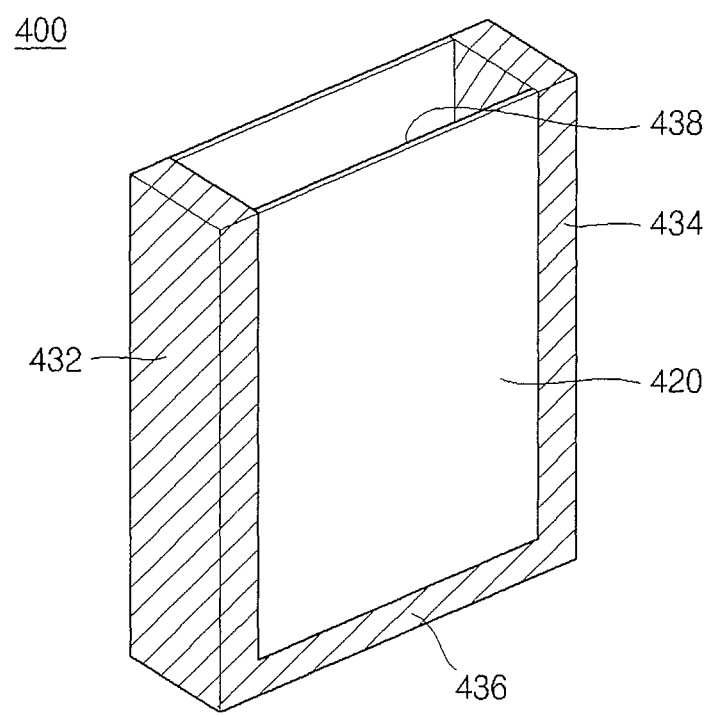
FIG. 7 is a perspective schematic view illustrating a coupling structure between a package member and a support plate in a battery pack according to another embodiment of the present invention.

FIG. 7 illustrates a battery pack 400 according to another embodiment of the present invention.

Referring to FIG. 7, the battery pack 400 is structured such that a package member 420 is coupled to support plates 432, 434 and 436 to form a case, and the support plates 432, 434 and 436 form a bottom surface and two opposite sides of the case.

The support plates 432, 434 and 436 may be formed integrally. Alternatively, the support plates 432, 434 and 436 may be separately formed and coupled to the package member 420.

Under such a structure, an opening 438 is formed at a top of the case. An electrode assembly (e.g., the electrode assembly 110 of FIG. 2) is inserted into the case via the opening 438. In this state, a terminal assembly (e.g., the terminal assembly 140 of FIG. 2) is inserted into the opening 438 and is electrically connected to the electrode assembly.

According to the battery pack 400 having the above-described structure, the package member 420 is coupled to the support plates 432, 434 and 436 to form the case for receiving the electrode assembly (e.g., the electrode assembly 110), and the support plates 432, 434 and 436 form a bottom surface and two opposite sides of the case. When the support plates 432, 434 and 436 have a rectangular plate shape as shown in FIG. 7 after coupling the terminal assembly (e.g., the terminal assembly 140) to the package member 420, the package member 420 can stably maintain a rectangular parallelepiped shape due to the coupling between it and the support plates 432, 434 and 436.

Such combination of the package member 420 with the support plates 432, 434 and 436 produces a structure very similar to a polygonal (e.g., four-sided) can.

Hereinafter, a method of manufacturing a battery pack according to embodiments of the present invention will be described in more detail.

That is, a method of manufacturing a battery pack according to an embodiment of the present invention will now be described with reference to FIG. 8.

Figure 8:
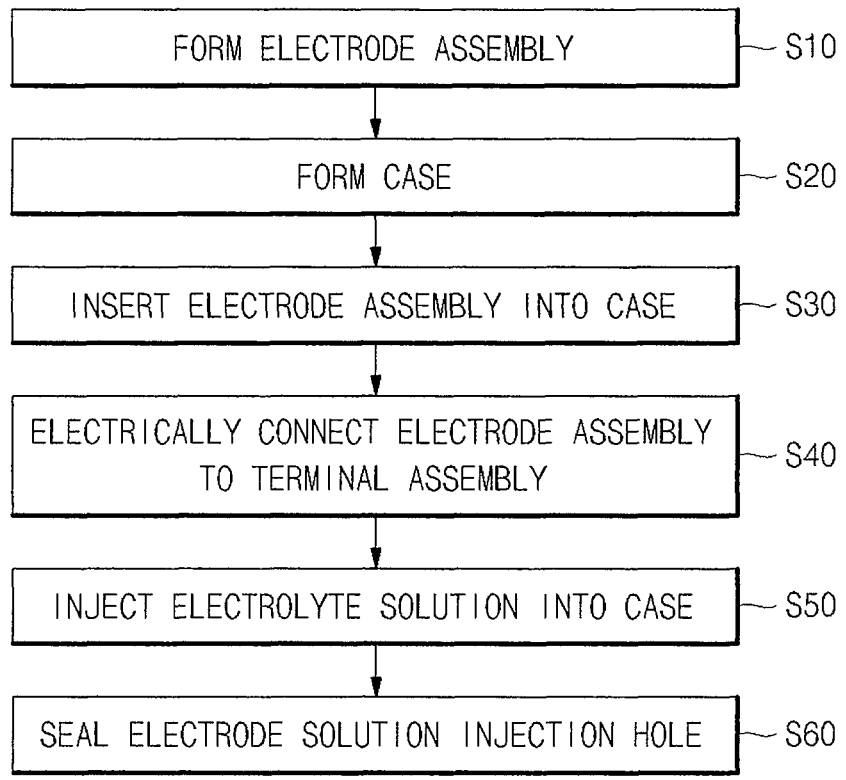
FIG. 8 is a flow diagram illustrating a method of manufacturing a battery pack according to an embodiment of the present invention.

As shown in FIG. 8, the method of manufacturing the battery pack includes forming an electrode assembly (S10); forming a case for receiving the electrode assembly by coupling a solid support plate to at least a portion of a laminate strengthened sheet type package member (S20); inserting the electrode assembly into the case (S30); electrically connecting the electrode assembly to a terminal assembly (S40); and injecting an electrolyte solution into the case (S50).

Referring to FIG. 8, together with FIGS. 1 through 4, in the formation of the electrode assembly (S10), a positive electrode plate 111, a negative electrode plate 112, and a separator 113 interposed therebetween are wound into a jelly roll-type structure, a positive electrode tab 114 is coupled to the positive electrode plate 111, and a negative electrode tab 115 is coupled to the negative electrode plate 112 to thereby complete an electrode assembly 110.

In the formation of the case (S20), a support plate 130 is coupled to at least a portion (e.g., a bottom end 120b in FIG. 1) of a package member 120 formed of a laminate strengthened sheet to thereby form a case. Here, the coupling between the package member 120 and the support plate 130 may be performed by heat treatment. Alternatively, the package member 120 may also be coupled to the support plate 130 by high frequency heating.

Then, the electrode assembly 110 is inserted into the case (S30) and is then electrically connected to a terminal assembly 140 (S40). Here, the terminal assembly 140 may be thermally fused to a top end 120a (in FIG. 1) of the package member 120. The terminal assembly 140 may also be coupled to the top end 120a of the package member 120 by high frequency heating.

In the injection of the electrolyte solution into the case (S50), an electrolyte solution is injected into the case via an electrolyte solution injection hole 124 formed in an upper side of the package member 120. Then, the electrolyte solution injection hole 124 is sealed with a sealing member 125 (S60). This completes the fabrication of a battery pack 100.

A method of manufacturing a battery pack according to another embodiment of the present invention will now be described with reference to FIG. 9.

Figure 9:
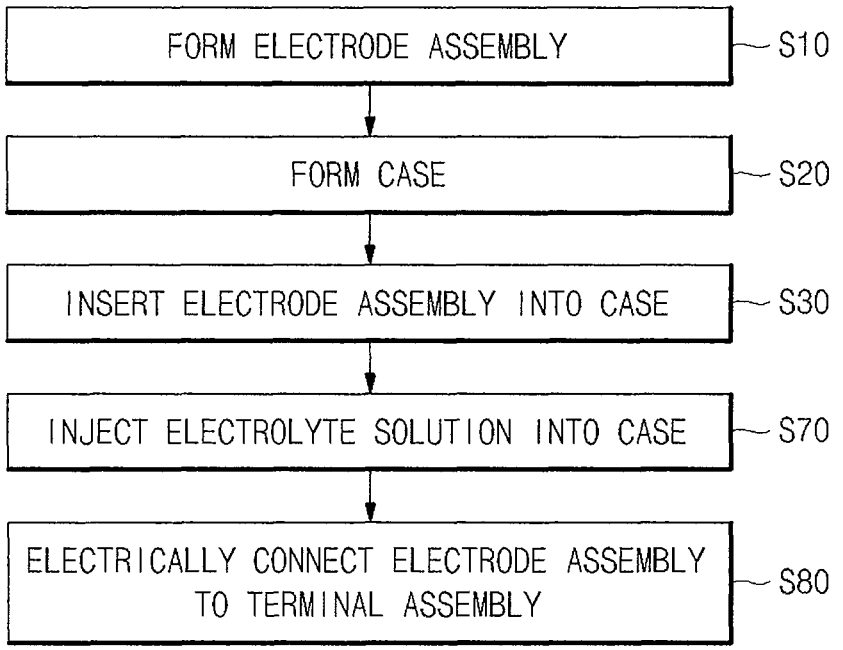
FIG. 9 is a flow diagram illustrating a method of manufacturing a battery pack according to another embodiment of the present invention.

As shown in FIG. 9, the method of manufacturing the battery pack includes forming an electrode assembly (S10); forming a case for receiving the electrode assembly by coupling a solid support plate to at least a portion of a laminate strengthened sheet type package member (S20); inserting the electrode assembly into the case (S30); injecting an electrolyte solution into the case (S70); and electrically connecting the electrode assembly to a terminal assembly (S80).

The battery pack manufacturing method of the current embodiment of the present invention is substantially the same as that of the previous embodiment in terms of steps S10 through S30.

Referring to FIG. 9, together with FIGS. 1 through 4, according to the current embodiment of the present invention, after inserting an electrode assembly 110 into a case formed by a package member 120 and a support plate 130 (S30), an electrolyte solution is injected into the case (S70). After injecting the electrolyte solution into the case, a terminal assembly 140 is electrically connected to the package member 120 (S80). Here, a cap plate 141 of the terminal assembly 140 may be coupled to a top end 120a of the package member 120 to thereby complete the battery pack 100. Therefore, according to the battery pack manufacturing method of the current embodiment of the present invention, it is not necessary to form an electrolyte solution injection hole in the package member 120.

As should be apparent from the above description, a battery pack (or battery) of an embodiment of the present invention is composed of a laminate strengthened sheet that is utilized as a package member (that is coupled to a support member to form a battery case). Here, since the battery pack (or battery) is composed of the laminate strengthened sheet that is utilized to form the package member, and the battery case is formed by coupling the support plate to at least a portion of the package member, the battery pack has an increased battery capacity as compared with a can type battery, and an increased strength as compared with a pouch type battery. Therefore, in embodiments of the present invention, a battery pack (or battery) with an increased battery capacity can be realized as compared with a can type battery, and a battery pack (or battery) with an increased strength can be realized as compared with a pouch type battery.

Furthermore, in an embodiment of the present invention, an electrode assembly is surrounded by a laminate strengthened sheet type package member, and it is electrically connected to a terminal assembly supplying current to an external circuit. Therefore, a battery cell fabrication process and a battery pack fabrication process are integrated and simplified, thereby resulting in improved battery productivity.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A battery pack comprising:
   an electrode assembly;
   a plurality of package members, each being composed of a laminate strengthened sheet having a first end, a second end opposite the first end, a first side, and a second side opposite the first side, wherein the first and second sides extend in a first direction and the first and second ends extend in a second direction transverse to the first direction;
   a monolithic first support plate coupled to the first side of each of the package members;
   a monolithic second support plate coupled to the second side of each of the package members;
   a monolithic third support plate coupled to the second end of each of the package members and coupled to an end of each of the first support plate and the second support plate; and a terminal assembly electrically connected to the electrode assembly for supplying current to an external circuit, the terminal assembly coupled to the first end of each of the package members and coupled to another end of each of the first support plate and the second support plate, wherein the package members are only coupled to each other through the first, second, and third support plates, and the terminal assembly to receive and seal the electrode assembly.

2. The battery pack of claim 1, wherein the package members have a rectangular shape.

3. The battery pack of claim 1, wherein the first and second support plates are composed of polypropylene.

4. The battery pack of claim 1, wherein the laminate strengthened sheet of each of the package members comprises:
   a blocking layer;
   an outer layer on a first surface of the blocking layer; and
   an inner layer on a second surface of the blocking layer opposite to the first surface of the blocking layer.

5. The battery pack of claim 4, wherein the blocking layer has a thickness between about 20 and about 150 μm, the outer layer has a thickness between about 5 and about 30 μm, and the inner layer has a thickness between about 30 and about 150 μm.

6. The battery pack of claim 4, wherein the blocking layer is composed of at least a metal selected from the group consisting of iron, nickel, aluminum, and combinations thereof.

7. The battery pack of claim 4, wherein the outer layer is composed of at least a material selected from the group consisting of nylon, polyethyleneterephthalate, and combinations thereof.

8. The battery pack of claim 4, wherein the inner layer is composed of cast polypropylene.

9. The battery pack of claim 1, wherein the terminal assembly comprises:
   a cap plate having a first terminal through-hole for receiving an electrode terminal;
   a top case coupled to the cap plate and having a second terminal through-hole for receiving an external terminal for supplying current from the electrode terminal to an external circuit; and
   a protection circuit board in the top case and comprising the external terminal electrically connected to the electrode terminal passing through the cap plate via the first terminal through-hole and for controlling charge-discharge of the battery pack.

10. The battery pack of claim 9, wherein the terminal assembly further comprises a secondary protection device between the cap plate and the protection circuit board.

11. A method of manufacturing a battery pack, the method comprising:
    forming an electrode assembly;
    forming a case for receiving the electrode assembly by coupling a plurality of monolithic support plates to at least a portion of each of a plurality of package members, each being formed of a laminate strengthened sheet and having a different structure than the support plates, the coupled package members having an open first end;
    forming an electrolyte solution injection hole in at least one of the package members;
    inserting the electrode assembly into the case; and
    electrically connecting the electrode assembly to a terminal assembly, the terminal assembly covering a top of the case on the first end of the package members.

12. The method of claim 11, further comprising injecting an electrolyte solution into the case via the electrolyte solution injection hole formed in the at least one of the package members, after the electrically connecting of the electrode assembly to the terminal assembly.

13. The method of claim 12, further comprising sealing the electrolyte solution injection hole, after the injecting of the electrolyte solution into the case.

14. The method of claim 11, further comprising injecting an electrolyte solution into the case, before the electrically connecting of the electrode assembly to the terminal assembly.

15. The method of claim 11, wherein during the electrically connecting of the electrode assembly to the terminal assembly, the terminal assembly is coupled to a portion of the package members by thermal fusion or high frequency heating.

* * * * *